(12) United States Patent
Druckman et al.

(10) Patent No.: US 9,920,559 B2
(45) Date of Patent: Mar. 20, 2018

(54) ADJUSTABLE SLIDING SCREEN APPARATUS

(71) Applicant: B/E Aerospace, Inc., Wellington, FL (US)

(72) Inventors: David J. Druckman, Tucson, AZ (US); Ian L. Frost, Tucson, AZ (US)

(73) Assignee: B/E Aerospace, Inc., Wellington, FL (US)

( * ) Notice: Subject to any disclaimer, the term of this patent is extended or adjusted under 35 U.S.C. 154(b) by 49 days.

(21) Appl. No.: 15/091,131

(22) Filed: Apr. 5, 2016

(65) Prior Publication Data

US 2016/0298370 A1 Oct. 13, 2016

Related U.S. Application Data

(60) Provisional application No. 62/145,157, filed on Apr. 9, 2015.

(51) Int. Cl.
*B64C 1/14* (2006.01)
*E05D 15/06* (2006.01)
(Continued)

(52) U.S. Cl.
CPC ........ *E05D 15/0643* (2013.01); *B64C 1/1438* (2013.01); *B64D 11/0606* (2014.12);
(Continued)

(58) Field of Classification Search
CPC ............ E05D 15/0643; E05D 15/0656; E05D 15/0678; B64C 1/1438; E06B 3/4636;
(Continued)

(56) References Cited

U.S. PATENT DOCUMENTS

| 1,450,729 | A | * | 4/1923 | Leeds | E05D 15/063 49/176 |
| 3,332,167 | A | * | 7/1967 | Fayer | E06B 3/4636 160/102 |

(Continued)

FOREIGN PATENT DOCUMENTS

| DE | 4424062 A1 * | 1/1996 | ............ F16C 11/069 |
| DE | 10355972 A1 * | 6/2004 | ............ B27B 5/065 |

(Continued)

OTHER PUBLICATIONS

International Search Report and Written Opinion of corresponding International Application No. PCT/US2016/026021; dated Jun. 30, 2016; 13 pages.

*Primary Examiner* — Jerry E Redman
(74) *Attorney, Agent, or Firm* — Shumaker, Loop & Kendrick, LLP

(57) ABSTRACT

An adjustable sliding privacy screen for a premium class passenger suite may include a guide rail mounted to a wall partition. The adjustable sliding privacy screen may also include a yaw and roll adjustment bracket slidingly attached to the guide rail and to the screen. The yaw and roll adjustment bracket may include a flanged adjustment screw for adjusting the yaw and roll of the screen and a locking screw for securing the yaw and roll adjustment of the screen. The screen may also include a ball joint adjustment bracket slidingly attached to the guide rail and to the screen. The ball joint adjustment bracket may include a ball joint and adjustment screw for adjusting the pitch of the screen and a locking nut for securing the pitch adjustment of the screen. The device of the present invention thus allows for the adjustment of the yaw, roll, and pitch of the screen.

5 Claims, 7 Drawing Sheets

(51) Int. Cl.
*B64D 11/06* (2006.01)
*E06B 3/46* (2006.01)

(52) U.S. Cl.
CPC ..... *E05D 15/0656* (2013.01); *E05D 15/0678* (2013.01); *E06B 3/4636* (2013.01); *E05Y 2900/502* (2013.01)

(58) Field of Classification Search
CPC . B64D 11/0606; Y10T 16/361; Y10T 16/364; Y10T 16/381; Y10T 16/3834; E05Y 2900/502
USPC .... 49/409, 410, 411, 425; 244/129.4, 129.5, 244/118.3
See application file for complete search history.

(56) References Cited

U.S. PATENT DOCUMENTS

| | | | | |
|---|---|---|---|---|
| 3,360,136 A * | 12/1967 | Ain | | A47F 7/0042 211/162 |
| 4,069,617 A * | 1/1978 | Koike | | B60J 1/17 16/93 R |
| 5,343,594 A * | 9/1994 | Harvey | | A47K 3/34 16/105 |
| 5,839,228 A * | 11/1998 | Duffy | | A47K 3/34 49/209 |
| 6,273,002 B1 * | 8/2001 | Hachmann | | B61F 5/02 105/199.1 |
| 6,427,286 B1 * | 8/2002 | Erskine | | B63B 43/26 16/90 |
| 6,442,900 B1 * | 9/2002 | Kvasnes | | E05D 15/1042 49/409 |
| 6,698,138 B1 * | 3/2004 | Lin | | E05D 15/0639 16/105 |
| 8,806,807 B2 * | 8/2014 | Rees | | E05D 15/48 49/130 |
| 8,925,258 B1 * | 1/2015 | Header | | E05D 15/00 16/90 |
| 8,960,602 B2 * | 2/2015 | Neumann | | B64D 11/0023 244/118.5 |
| 9,038,316 B2 * | 5/2015 | Von Gerichten | | E05D 15/063 49/360 |
| 9,482,040 B2 * | 11/2016 | Pettersson | | E05D 15/063 |
| 2004/0107646 A1 * | 6/2004 | Elmer | | E05D 15/0652 49/410 |
| 2005/0000164 A1 | 1/2005 | Jacobs | | |
| 2008/0134538 A1 | 6/2008 | Polus | | |
| 2010/0205772 A1 * | 8/2010 | Haab | | E05D 15/0656 16/91 |
| 2012/0023705 A1 * | 2/2012 | Schmehr | | F16C 11/045 16/367 |
| 2013/0160240 A1 * | 6/2013 | Kenny | | E05D 15/0626 16/89 |
| 2013/0241246 A1 | 9/2013 | Round et al. | | |
| 2016/0258198 A1 * | 9/2016 | Bouthillier | | E05D 15/0656 |
| 2016/0287027 A1 * | 10/2016 | Hayes | | A47K 3/34 |
| 2017/0106980 A1 * | 4/2017 | Kuyper | | B64D 11/0602 |

FOREIGN PATENT DOCUMENTS

| | | | | |
|---|---|---|---|---|
| EP | | 134971 A2 * | 5/1984 | |
| EP | | 1043469 A1 * | 10/2000 | ........ E05D 15/0604 |
| FR | | 2651529 A1 * | 3/1991 | ........ E05D 15/0626 |
| FR | | 2737749 A1 * | 2/1997 | ........ E05D 15/0626 |
| FR | | 2793277 A1 * | 11/2000 | ............ B60J 5/062 |
| GB | | 2 321 269 A | 7/1998 | |
| JP | | 03244775 A * | 10/1991 | |

* cited by examiner

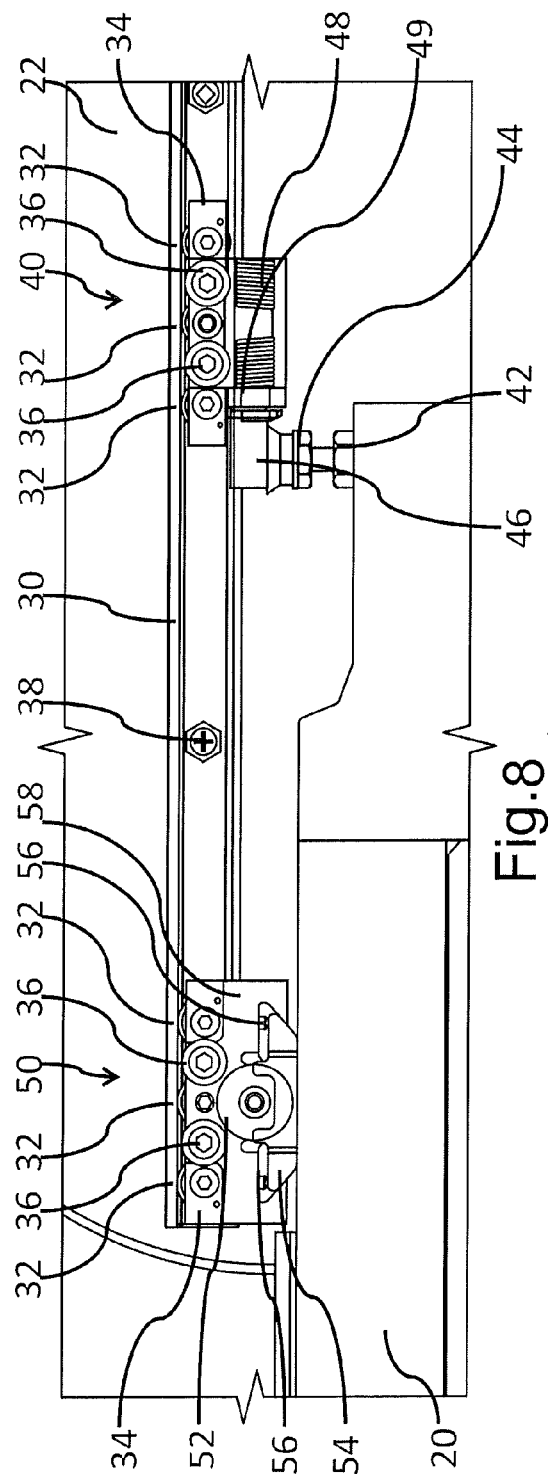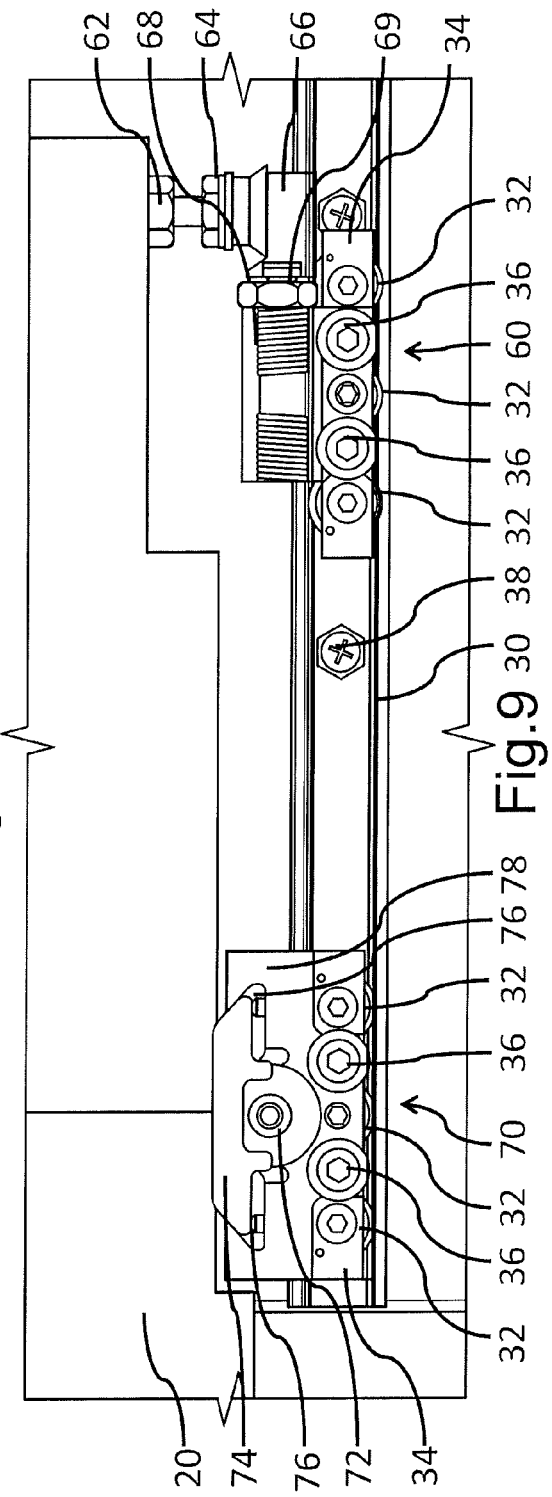

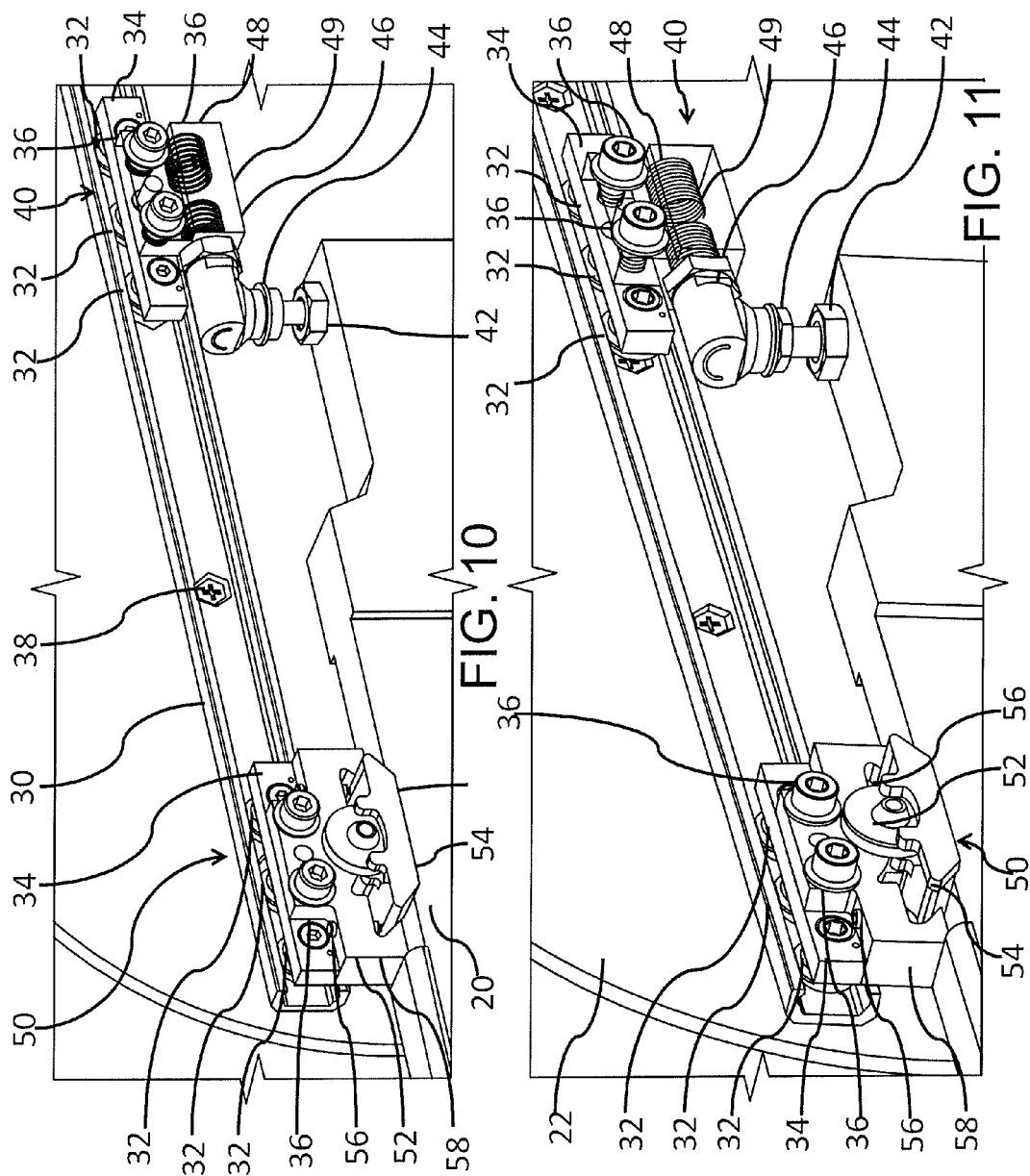

ADJUSTABLE SLIDING SCREEN APPARATUS

CROSS-REFERENCE TO RELATED APPLICATIONS

This application is a non-provisional patent application which traces priority to and incorporates by reference the entirety of U.S. provisional application having application No. 62/145,157 filed on Apr. 9, 2015.

TECHNICAL FIELD AND BACKGROUND OF THE INVENTION

The present invention relates generally to compartment closure mechanisms and more particularly to closure mechanisms for use in vehicle compartments. The invention is an adjustable sliding apparatus for doors, screens, privacy partitions, and the like for use in vehicles. As used herein, the term door or the term screen will be synonymous with one another and also inclusive of any and all other such moveable privacy partitions.

Premium passenger seating arrangements in aircraft can take the form of individual suites separated and defined by walls and partitions. Such suites typically include a passenger living area outfitted with comfort, luxury, and convenience features such as lie-flat adjustable seats, desks, advanced media and electronics, closets and various storage compartments, among other amenities.

With the development of passenger suites, there is a continuing effort to offer more and better features and amenities to passengers to further accommodate their needs and increase the level of luxury of such suites. There is also a continuing effort to arrange suites to maximize seating density in an aircraft, maximize the use of limited space in the suites, maintain lightweight fixtures, and maintain the perceived openness of the suites. While passengers have come to expect certain amenities, the inclusion of amenities comes with additional cost, weight, complexity, and space requirements.

Privacy of passengers in premium class suite seating is of particular importance. However, adding doors and walls to aircraft interiors can be bulky and heavy—both features which it is desirable to minimize. Therefore, there is a need in the art for premium aircraft suite doors and privacy screens which are lightweight and low profile.

Further, as aircraft and other vehicles are frequently in motion including acceleration, deceleration, and maneuvers, aircraft interiors experience forces which cause contents of the aircraft to jostle and move. In some cases, even interior fixtures such as doors and privacy screens may move out of alignment and require adjustment. The door's pitch, yaw, and roll are subject to change and may need realignment. Current mechanisms for adjusting the position and angles of sliding screens (for alignment) are difficult to adjust, take up large amounts of space and usually need to be tailored to specific screen configurations. Thus, there is a need for a mechanism which is easy to adjust, has a small envelope, and easily mounts to various door configurations would be beneficial. Further, because aircraft have little downtime between flights—such as flights were a suite's privacy doors may have become out of alignment—there is a need in the art for a door adjustment mechanism that may quickly be adjusted.

BRIEF SUMMARY OF THE INVENTION

It is therefore an object of the present invention to provide an adjustable sliding privacy screen apparatus for a vehicle which may easily and quickly be adjusted. It is another object of the present invention that the adjustable sliding privacy screen apparatus may be lightweight and have a low profile. It is a further object of the invention to provide an apparatus that has few machined parts. It is a further object of the present invention that the apparatus be configured to adjust the pitch, roll, and yaw of the privacy screen.

To achieve the foregoing and other aspects and advantages, in one embodiment a mechanism is provided which utilizes two adjustment brackets mounted between the sliding screen/door and guide rail at a top portion of the screen/door. These adjustment brackets allow for adjustment of pitch, yaw and roll angles of the screen. A second guide rail and a second set of adjustment brackets may be mounted at the bottom of the screen/door.

According to one aspect of the invention, adjustment can be performed with simple tools and with much greater ease than with the prior art.

According to another aspect of the invention, a first bracket is a yaw/roll bracket that can rock to accommodate a ball joint adjustment bracket. According to such an embodiment, the ball joint of the ball joint adjustment bracket can rotate to accommodate yaw/roll adjustment.

According to another aspect of the invention, any adjustments that are made to either of the brackets can be "locked" into place.

According to another aspect of the invention, the apparatus is very compact having a small envelope. The invention is versatile and may be used on many different types of screens/doors with only minor screen design changes. The invention is optimized for strength and may include a small number of parts including as few as 6 machined parts per screen.

According to one embodiment of the invention, the apparatus includes a guide rail mounted to a suite wall or partition. A pair of trucks is slidingly connected to the guide rails via roller bearings. One adjustable bracket is attached to each truck and the privacy screen/door is attached to the brackets.

According to one embodiment of the invention, one of the adjustable brackets is a yaw/roll bracket which facilitates adjustment of the yaw and roll of the screen. The other adjustment bracket is a ball joint bracket which facilitates adjustment of the pitch of the door and also accommodates adjustment of the yaw/roll bracket.

According to another embodiment of the invention, the rail and the brackets are located at or near a top portion of the screen.

According to another embodiment of the invention, a second rail and bracket set is located at or near a bottom portion of the screen.

According to another embodiment of the invention, the yaw/roll bracket includes a flanged adjustment screw and one or more locking screws. The ball joint bracket includes a ball joint, an adjustment screw, and a locking nut.

According to another embodiment of the invention, the yaw/roll bracket includes a carriage connected to the truck and a cradle connected to the carriage via the flanged adjustment screw. According to such an embodiment, the screen/door may be connected to the cradle. The cradle may partially reside in a void within the carriage. The flanged adjustment screw may set the location of the cradle within the carriage and the locking screws may secure cradle within the void of the carriage. The setting of the cradle within the carriage by the flanged adjustment screw may be used adjust the yaw and roll of the screen/door with the locking screws securing the adjustment in place.

According to another embodiment of the invention, the ball joint bracket includes a carriage connected to the truck and a ball joint connected to the carriage and also to the screen/door. The ball joint bracket also includes an adjustable nut for adjusting the length of the ball joint which imparts an adjustment to the pitch of the screen/door. The ball joint further includes a locking nut which secures the position of the ball joint relative the screen/door and the carriage.

According to another embodiment of the invention, the ball joint of the ball joint bracket may be housed in a ball joint housing. The ball joint may include a ball portion and a lever portion with the ball joint portion housed in the ball joint housing and the lever portion extending from the ball joint housing and attaching to the screen/door at a point nearest the locking nut.

According to another embodiment of the invention, the carriage of the yaw/roll bracket and the carriage of the ball joint bracket are each attached to top portions of the screen/door. The guide rails are attached to a partition or wall. The rails may be attached by screw means. The respective carriages of the yall/roll bracket and the ball joint bracket may be attached to the respective trucks via bolt means.

According to another embodiment of the invention, the screen/door is housed within the partition or wall when in the stowed position in the manner of a pocket door.

According to another embodiment of the invention, the premium class aircraft passenger suite enclosed is enclosed by a fixed partition and has an adjustable sliding privacy screen. The suite has a yaw/roll adjustment bracket for adjusting the yaw/roll of the privacy screen and a ball joint adjustment bracket for adjusting the pitch of the privacy screen.

According to another embodiment of the invention, the screen is made from lightweight materials and has a low profile relative the fixed partition.

According to another embodiment of the invention, the yaw/roll adjustment bracket further includes a flanged adjustment screw for adjusting the yaw and roll of the screen.

According to another embodiment of the invention, the ball joint adjustment bracket further includes an adjustment screw for adjusting the pitch of the screen.

According to another embodiment of the invention, the yaw/roll adjustment bracket and the ball joint adjustment bracket are attached to a top portion of the privacy screen and further includes a lower yaw/roll adjustment bracket attached to a bottom portion of the privacy screen for adjusting the yaw roll of the screen and a lower ball joint adjustment bracket attached to a bottom portion of the privacy screen for adjusting the pitch of the privacy screen.

According to another embodiment of the invention, a premium class aircraft passenger suite may be enclosed by a fixed partition and include an adjustable sliding privacy screen. The suite may include a guide rail mounted to the fixed partition, a yaw/roll adjustment bracket slidingly attached to the guide rail and attached to the screen, and a ball joint adjustment bracket slidingly attached to the guide rail and attached to the screen.

According to another embodiment of the invention, the yaw/roll adjustment bracket may be attached to a top portion of the screen. The ball joint adjustment bracket may be attached to the top portion of the screen. The suite may further include a lower guide rail mounted to a lower portion of the fixed partition, a lower yaw/roll adjustment bracket slidingly attached to the lower guide rail and attached to a bottom portion of the screen, and a lower ball joint adjustment bracket slidingly attached to the lower guide rail and attached to a bottom portion of the screen.

According to another embodiment of the invention, the yaw/roll bracket and the lower yaw/roll bracket may each include a flanged adjustment screw for adjusting the yaw and roll of the screen and a locking screw for securing the yaw and roll adjustment of the screen. Further, the ball joint adjustment bracket and the lower ball joint adjustment bracket may each further include a ball joint and an adjustment screw for adjusting the pitch of the screen and a locking nut for securing the pitch adjustment of the screen.

According to another embodiment of the invention, the yaw/roll bracket and the lower yaw/roll bracket may each further include one or more roller bearings sized to slide in the respective guide rail and lower guide rail, a truck attached to the roller bearings, a carriage attached to the truck and having a void, and a cradle attached to the screen and to the carriage, sized to fit within the void of the carriage and movable within the void as the flanged adjustment screw is manipulated.

According to another embodiment of the invention, the ball joint adjustment bracket and the ball joint adjustment bracket may each further include one or more of roller bearings sized to slide in the respective guide rail and lower guide rail, a truck attached to the roller bearings, a carriage attached to the truck, and a ball joint attached to the truck and to the screen and housed in a housing.

According to another embodiment of the invention, the screen may be made of lightweight materials and may have a low profile relative the fixed partition.

According to another embodiment of the invention, a premium class aircraft passenger suite may be enclosed by a fixed partition and may include an adjustable sliding privacy screen. The suite may include an upper guide rail mounted to the fixed partition, a lower guide rail mounted to the fixed partition at an opposite end of the fixed partition from the upper guide rail, an upper yaw/roll adjustment bracket slidingly attached to the upper guide rail and attached to an upper portion of the screen and having a yaw/roll flanged adjustment screw, a lower yaw/roll adjustment bracket slidingly attached to the lower guide rail and attached to the lower portion of the screen and having a yaw/roll flanged adjustment screw, an upper ball joint adjustment bracket slidingly attached to the upper guide rail and attached to the upper portion of the screen and having a pitch adjustment screw, and a lower ball joint adjustment bracket slidingly attached to the lower guide rail and attached to the lower portion of the screen and having a pitch adjustment screw.

According to another embodiment of the invention, the upper yaw/roll bracket and the lower yaw/roll bracket may each further include a plurality of roller bearings sized to slide in the respective upper guide rail and lower guide rail, a truck attached to the roller bearings, a carriage attached to the truck and having a void, and a cradle attached to the screen and to the carriage, sized to fit within the void of the carriage and movable within the void as the flanged adjustment screw is manipulated.

According to another embodiment of the invention, the upper ball joint adjustment bracket and the lower ball joint adjustment bracket may each further include a plurality of roller bearings sized to slide in the respective upper guide rail and lower guide rail, a truck attached to the roller bearings, a carriage attached to the truck, and a ball joint attached to the truck and to the screen and housed in a housing.

According to another embodiment of the invention, the upper yaw/roll bracket and the lower yaw/roll bracket may each further comprise a pair of locking screws which extends through the carriage, into the void, and contacts an upper surface of the cradle.

According to another embodiment of the invention, the upper ball joint adjustment bracket and the lower ball joint adjustment bracket may each include a locking nut for securing the pitch adjustment of the screen.

BRIEF DESCRIPTION OF THE DRAWINGS

Features, aspects and advantages of the present invention are understood when the following detailed description of the invention is read with reference to the accompanying drawings, in which:

FIG. 8 is a side view of the top adjustable sliding apparatus;

FIG. 9 is a side view of the bottom adjustable sliding apparatus;

FIG. 10 is a side perspective view of the top adjustable sliding apparatus;

FIG. 11 is a side perspective view of the top adjustable sliding apparatus; and

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, provided herein are various embodiments of passenger suite seating arrangements, for example, for installation within an aircraft or other conveyance. The term "suite" as used herein includes individual passenger living compartments or living spaces generally including adjustable seats, working surfaces, tray tables, video equipment, etc. Each suite may have its own entrance accessible from an aisle. Suites may be divided and separated by one or more of partitions, shared structures, privacy walls, etc. Directions and offsets are generally described herein with reference to the longitudinal axis of the aircraft or conveyance, wherein the "longitudinal direction" is intended to be along the length of the aircraft and the "lateral" direction is intended to be in the direction perpendicular to the longitudinal axis of the aircraft. Further, as used herein, the term door or the term screen will be synonymous with one another and also inclusive of any and all other such moveable privacy partitions as might be found in a vehicle.

Figure 1:
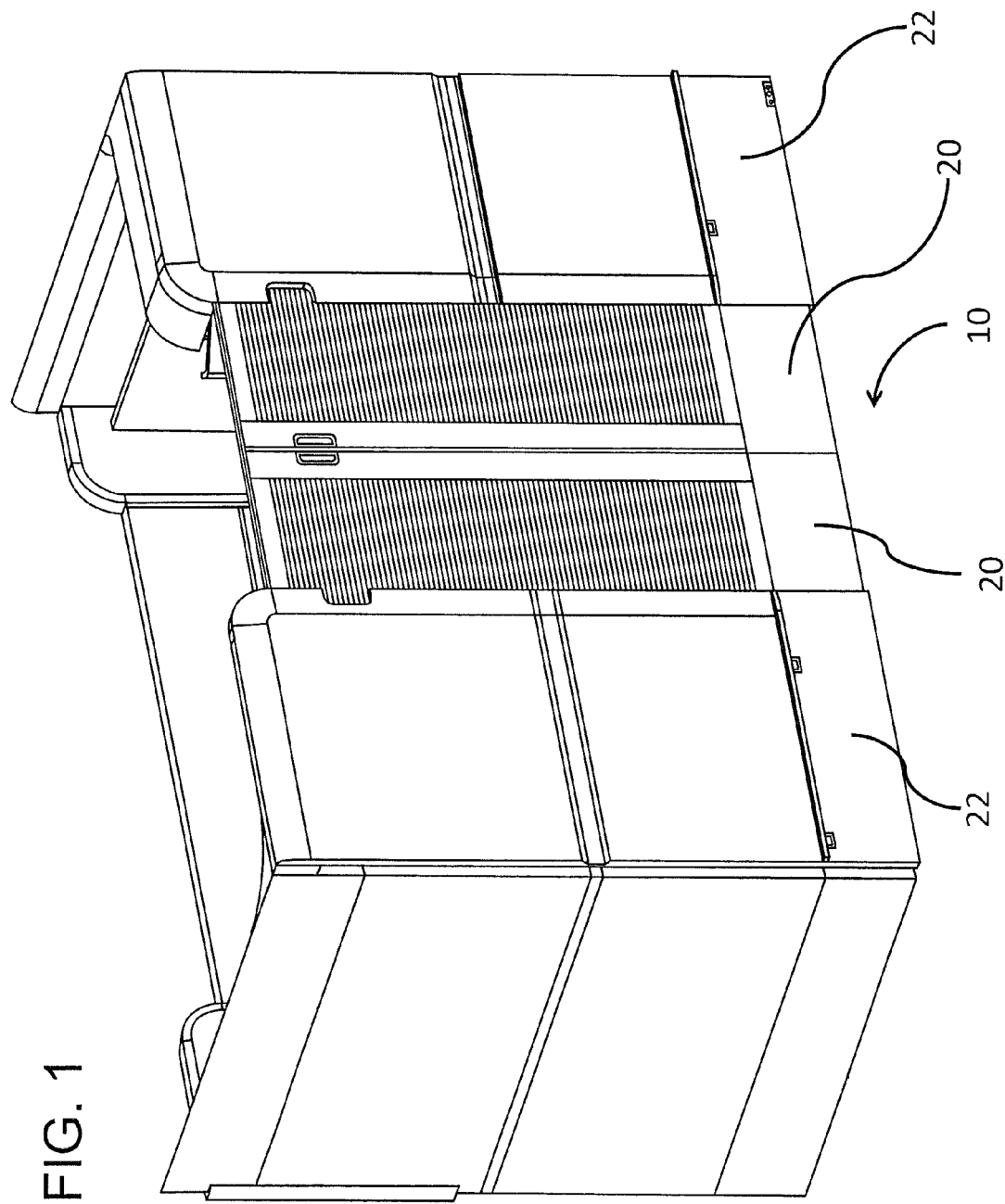
FIG. 1 is a side perspective view of the outside of a passenger suite showing a pair of closed doors and incorporating the adjustable sliding apparatus of the present invention.
Figure 2:
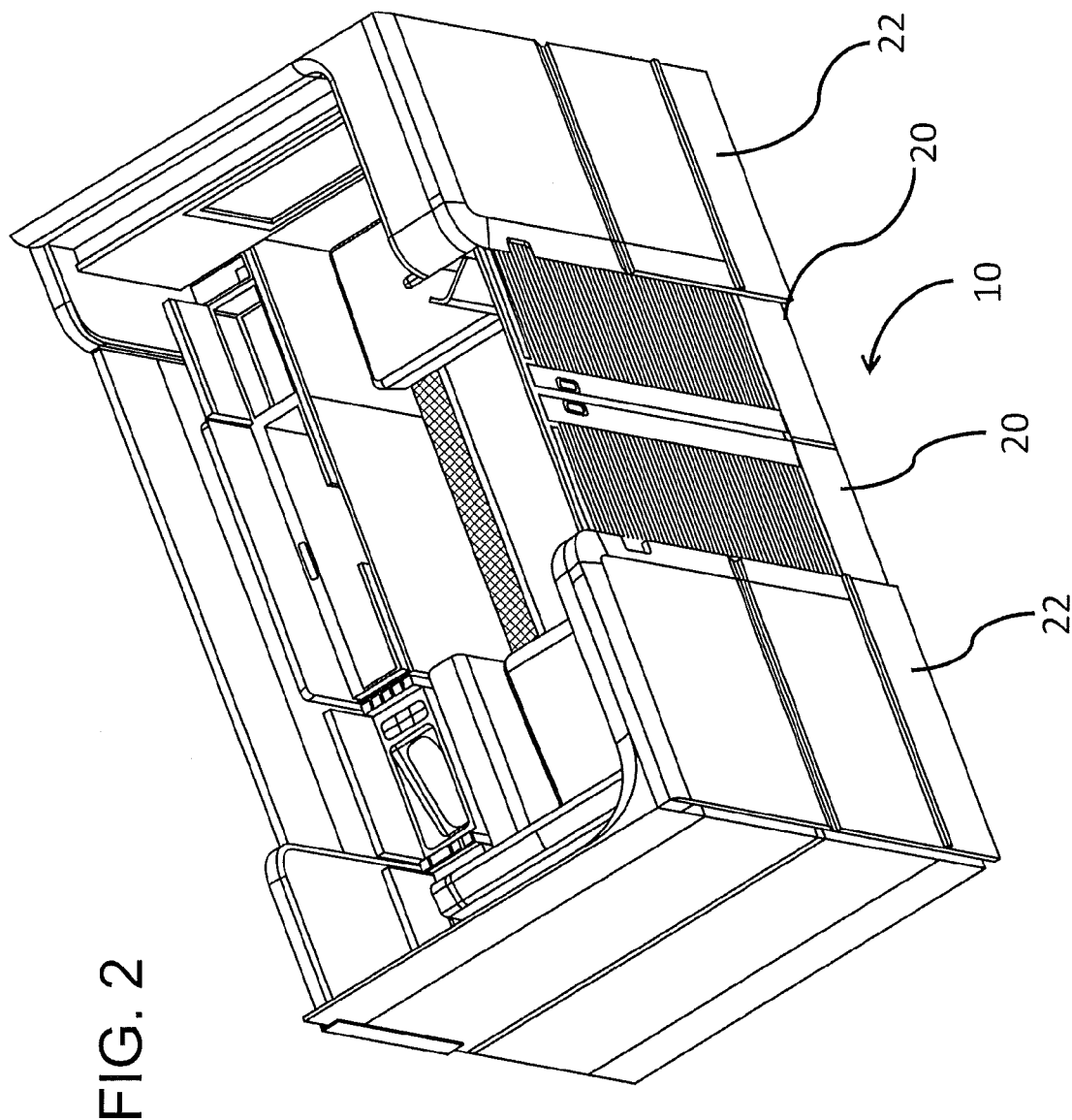
FIG. 2 is a top perspective view of the outside of a passenger suite showing a pair of closed doors and incorporating the adjustable sliding apparatus of the present invention.
Figure 4:
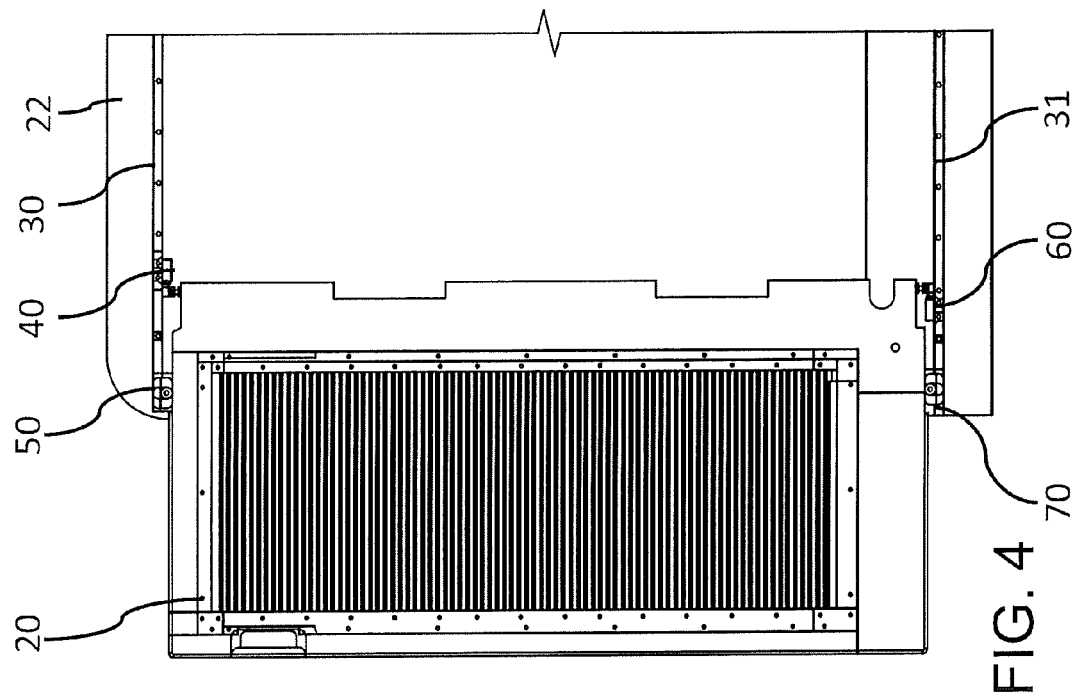
FIG. 4 is a side view of one door, wall, and the adjustable sliding apparatus of the present invention.
Figure 3:
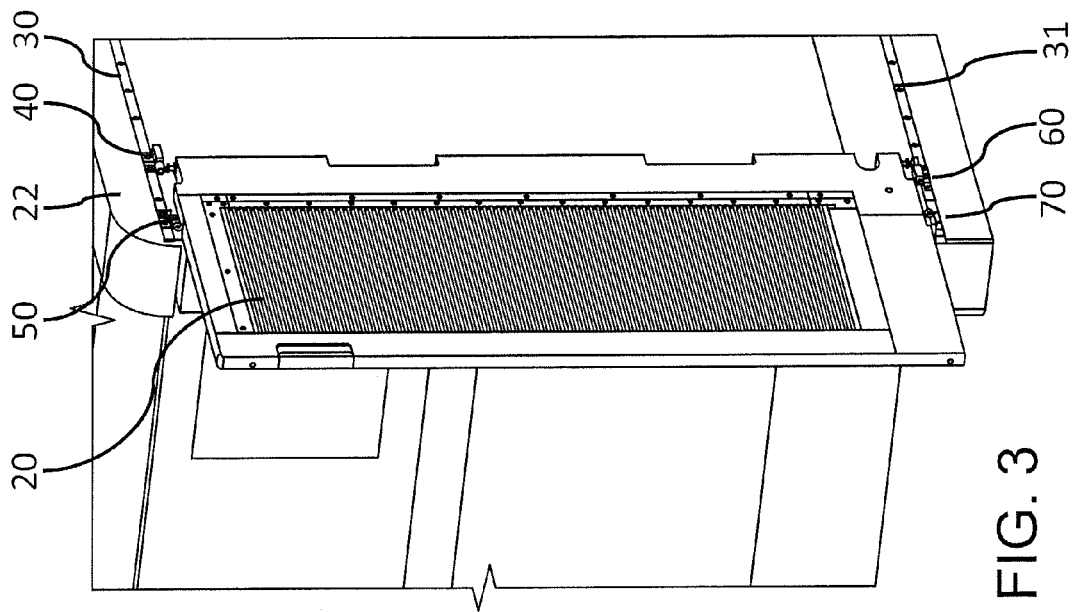
FIG. 3 is an interior perspective view of one door, wall, and the adjustable sliding apparatus of the present invention.
Figure 5:
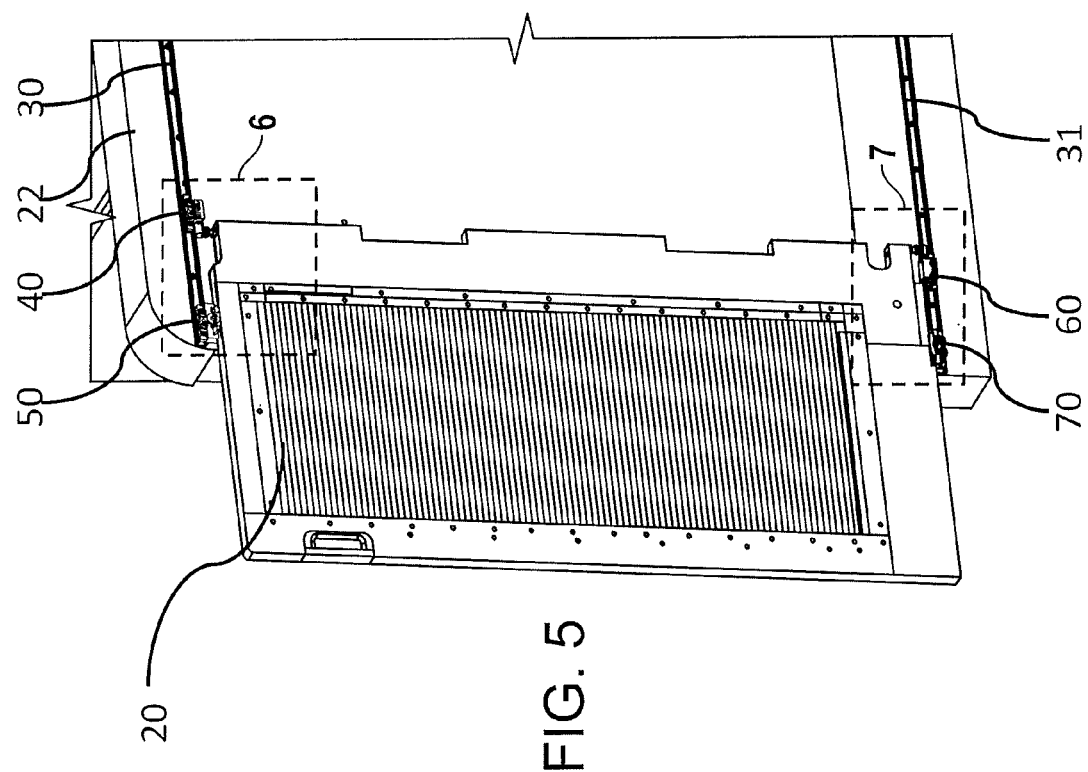
FIG. 5 is an interior perspective view of one door, wall, and the adjustable sliding apparatus of the present invention.

FIG. 1 and FIG. 2 show a premium passenger suite 10 of an aircraft cabin. The suite 10 has partition walls 22 and screens 20. The screens 20 serve to provide a level of privacy to an occupant of the cabin 10. The screens 20 are shown as a pair of pocket doors, housed in a stowed position within the partition walls 22, which slide towards each other toward the deployed position shown in the figures.

Figure 6:
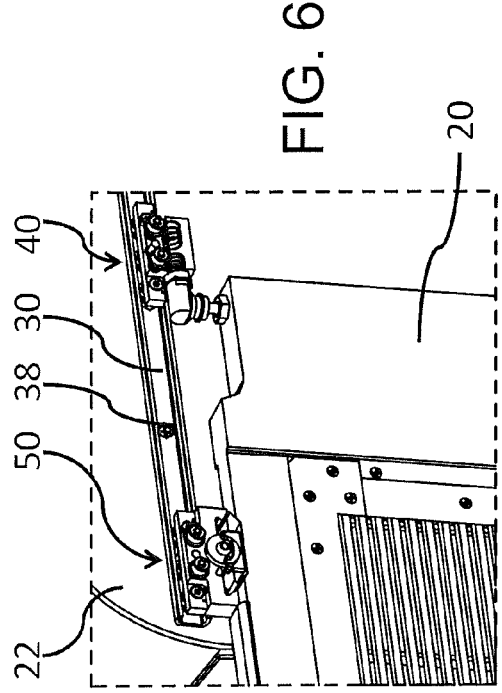
FIG. 6 is a partial view of the top adjustable sliding apparatus of FIG. 5.
Figure 7:
FIG. 7 is a partial view of the bottom adjustable sliding apparatus of FIG. 5.
Figure 12:
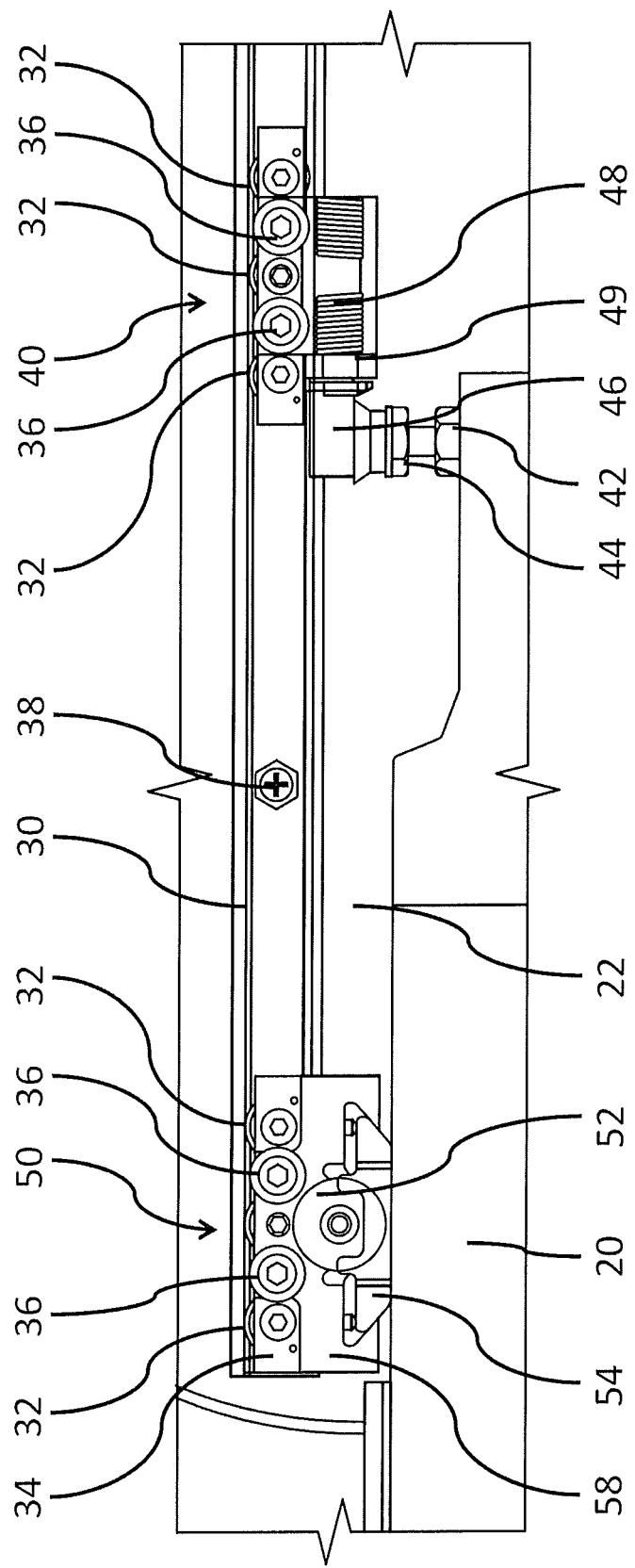
FIG. 12 is a side perspective view of the top adjustable sliding apparatus.

Referring now to FIGS. 3, 4, 5, 6, and 7, top guide rail 30 and bottom guide rail 31 are attached to the partition walls 22. Top yaw/roll bracket 50 is slidingly attached to rail 30 and to a top portion of screen 20. Top ball joint bracket 40 is slidingly attached to rail 30 and to a top portion of screen 20. Bottom yaw/roll bracket 70 is attached to bottom rail 31 and to a bottom portion of screen 20. Bottom ball joint bracket 60 is attached to bottom rail 31 and to a bottom portion of screen 20. Each of the top and bottom yall/roll brackets 50 and 70, respectively, are configured to be adjustable so that the yall and the roll of the screen 20 may be easily and quickly adjusted as necessary. Likewise, each of the top and bottom ball joint brackets 40 and 60, respectively, are configured to be adjustable so that the pitch of the screen 20 may be easily and quickly adjusted as necessary and also so that the yall and roll of the screen, as adjusted by the yall/roll brackets 50, 70 may be accommodated. As shown in FIGS. 6 and 7, guide rails 30 and 31 may be attached to partition 22 by screws 38.

Referring now to FIGS. 8, 9, 10, 11, and 12, a close up view of an embodiment of the sliding screen arrangement is depicted. In particular, FIGS. 8, 10, 11, and 12 show the top portions of the sliding screen and FIG. 9 shows the bottom portion which largely parallels the top portions.

As shown in FIGS. 8, 10, 11, and 12, the guide rails 30 are attached to the partition walls 22 by screw 38. The trucks 34 are slidingly attached to the guide rails 30 via roller bearings 32. Bolts 36 attach the trucks 34 to the yaw/roll bracket 50. Bolts 36 also attach the trucks 34 to the ball joint bracket 40.

The top yaw/roll bracket 50 further includes a carriage 58 attached via the bolts 36 to the trucks 34. Cradle 54 is attached to carriage 58 via flanged adjustment screw 52. The carriage 58 includes a void (best shown in FIGS. 10-11) into which the cradle 54 fits and maneuvers. The cradle 54 is able to move within the void of the carriage 58 as the flanged adjustment screw 52 is manipulated. This manipulation of the flanged adjustment screw 52 allows the yaw and roll of the screen 20 to be adjusted. The yaw/roll bracket 50 further includes a pair of locking screws 56. The locking screws 56 move from an unlocked position where the cradle 54 and the flanged adjustment screw 52 are free to be manipulated by a technician, to a locked position where the screws 56 are in contact with the cradle 54 and prevent movement of the cradle 54. Preferably the screws 56 extend through the carriage 58.

The top ball joint bracket 40 further includes carriage 48 which is attached to the truck 34 via bolts 36. The ball joint bracket 40 includes ball joint 46 which is housed in a housing and is attached to the carriage 48 at connection 49.

The ball joint 46 is surrounded by an adjustment screw 44 which applies a force against the ball joint 46 within the housing. Movement of the adjustment screw 44 adjusts the pitch of the screen 20 by raising or lowering the ball joint 46 within the housing. The ball joint 46 is also attached the screen 20. After a desired pitch of the screen 20 has been achieved, a technician may adjust a locking nut 42 to lock the ball joint 46 in place.

In some embodiments, both a top and bottom sliding adjustment system are employed. Referring specifically to FIG. 9, the bottom yaw/roll bracket 70 further includes a carriage 78 attached via the bolts 36 to the trucks 34. Cradle 74 is attached to carriage 78 via flanged adjustment screw 72. The carriage 78 includes a void into which the cradle 74 fits and maneuvers. The cradle 74 is able to move within the void of the carriage 78 as the flanged adjustment screw 72 is manipulated. This manipulation of the flanged adjustment screw 72 allows the yaw and roll of the screen 20 to be adjusted. The yaw/roll bracket 70 further includes a pair of locking screws 76. The locking screws 76 move from an unlocked position where the cradle 74 and the flanged adjustment screw 72 are free to be manipulated by a technician, to a locked position where the screws 76 are in contact with the cradle 74 and prevent movement of the cradle 74. Preferably the screws 76 extend through the carriage 58.

The bottom ball joint bracket 60 further includes carriage 68 which is attached to the truck 34 via bolts 36. The ball joint bracket 60 includes ball joint 66 which is housed in a housing and is attached to the carriage 68 at connection 69. The ball joint 66 is surrounded by an adjustment screw 64 which applies a force against the ball joint 66 within the housing. Movement of the adjustment screw 64 adjusts the pitch of the screen 20 by raising or lowering the ball joint within the housing. The ball joint 66 is also attached the screen 20. After a desired pitch of the screen 20 has been achieved, a technician may adjust a locking nut 62 to lock the ball joint 66 in place.

Therefore, viewing the FIGS. 1-12, it can be seen that the ball joint brackets 40, 60 and the yaw/roll brackets 50, 70, each sliding on guide rails 30, 31 and attached to screen 20 facilitate the sliding of the screen 20 and also the adjustment of the pitch, roll, and yaw of the screen 20 in an efficient manner.

An aircraft passenger cabin 10 with sliding screens 20 and adjustable brackets 40, 50, 60, and 70 according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. A premium class aircraft passenger suite enclosed by a fixed partition and an adjustable sliding privacy screen comprising:
    an upper guide rail mounted to an upper portion of the fixed partition;
    a lower guide rail mounted to an upper portion of the fixed partition at an opposite end of the fixed partition from the upper guide rail;
    an upper yaw and roll adjustment bracket slidingly attached to the upper guide rail and attached to an upper portion of the screen and having a yaw and roll flanged adjustment screw;
    a lower yaw and roll adjustment bracket slidingly attached to the lower guide rail and attached to the lower portion of the screen and having a yaw and roll flanged adjustment screw;
    an upper ball joint adjustment bracket slidingly attached to the upper guide rail, spaced apart from the upper yaw and roll adjustment bracket along the upper guide rail, attached to the upper portion of the screen, and having a pitch adjustment screw; and
    a lower ball joint adjustment bracket slidingly attached to the lower guide rail, spaced apart from the lower yaw and roll adjustment bracket along the lower guide rail, attached to the lower portion of the screen, and having a pitch adjustment screw.

2. The premium class aircraft passenger suite of claim 1 wherein the upper yaw and roll bracket and the lower yaw and roll bracket each further comprise:
    a plurality of roller bearings sized to slide in respective upper guide rail and lower guide rail;
    a truck attached to the plurality of roller bearings;
    a carriage attached to the truck and having a void; and
    a cradle attached to the screen and to the carriage, sized to fit within the void of the carriage and movable within the void as the flanged adjustment screw is manipulated.

3. The premium class aircraft passenger suite of claim 2 wherein the upper yaw and roll bracket and the lower yaw and roll bracket each further comprises a pair of locking screws which extends through the carriage, into the void, and contacts an upper surface of the cradle.

4. The premium class aircraft passenger suite of claim 1 wherein the upper ball joint adjustment bracket and the lower ball joint adjustment bracket each further comprise:
    a plurality of roller bearings sized to slide in the respective upper guide rail and lower guide rail;
    a truck attached to the plurality of roller bearings;
    a carriage attached to the truck; and
    a ball joint attached to the truck and to the screen and housed in a housing.

5. The premium class aircraft passenger suite of claim 4 wherein the upper ball joint adjustment bracket and the lower ball joint adjustment bracket each further comprises a locking nut for securing the pitch adjustment of the screen.

* * * * *